US011816509B2

(12) United States Patent
Sivaraman et al.

(10) Patent No.: US 11,816,509 B2
(45) Date of Patent: Nov. 14, 2023

(54) WORKLOAD PLACEMENT FOR VIRTUAL GPU ENABLED SYSTEMS

(71) Applicant: VMware, Inc., Palo Alto, CA (US)

(72) Inventors: Hari Sivaraman, Livermore, CA (US); Uday Pundalik Kurkure, Los Altos Hills, CA (US); Lan Vu, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 565 days.

(21) Appl. No.: 16/742,108

(22) Filed: Jan. 14, 2020

(65) Prior Publication Data
US 2021/0216375 A1 Jul. 15, 2021

(51) Int. Cl.
*G06F 9/50* (2006.01)
*G06F 9/54* (2006.01)
*G06F 9/30* (2018.01)
*G06N 3/045* (2023.01)

(52) U.S. Cl.
CPC ........ *G06F 9/5077* (2013.01); *G06F 9/30029* (2013.01); *G06F 9/5011* (2013.01); *G06F 9/5083* (2013.01); *G06F 9/546* (2013.01); *G06N 3/045* (2023.01)

(58) Field of Classification Search
CPC .. G06F 9/5077; G06F 9/30029; G06F 9/5011; G06F 9/5083; G06F 9/546; G06N 3/0454
See application file for complete search history.

(56) References Cited

U.S. PATENT DOCUMENTS

| 2017/0132746 A1* | 5/2017 | Wilt | G06F 9/5077 |
| 2017/0178346 A1* | 6/2017 | Ferro | G06N 3/084 |
| 2019/0026624 A1* | 1/2019 | Steiner | G06N 3/084 |
| 2021/0011751 A1* | 1/2021 | Garg | G06F 9/5044 |

OTHER PUBLICATIONS

Sivaraman, Hari, Uday Kurkure, and Lan Vu. "Task Assignment in a Virtualized GPU Enabled Cloud." 2018 International Conference on High Performance Computing & Simulation (HPCS). IEEE, pp. 895-900. (Year: 2018).*
Trippi, Robert R., and Duane DeSieno. "Trading equity index futures with a neural network." Journal of Portfolio Management 19 (1992): pp. 27-27. (Year: 1992).*

(Continued)

*Primary Examiner* — Meng Ai T An
*Assistant Examiner* — Willy W Huaracha
(74) *Attorney, Agent, or Firm* — Thomas Horstemeyer, LLP

(57) ABSTRACT

Disclosed are aspects of workload selection and placement in systems that include graphics processing units (GPUs) that are virtual GPU (vGPU) enabled. In some aspects, workloads are assigned to virtual graphics processing unit (vGPU)-enabled graphics processing units (GPUs) based on a variety of vGPU placement models. A number of vGPU placement neural networks are trained to maximize a composite efficiency metric based on workload data and GPU data for the plurality of vGPU placement models. A combined neural network selector is generated using the vGPU placement neural networks, and utilized to assign a workload to a vGPU-enabled GPU.

20 Claims, 5 Drawing Sheets

(56) References Cited

OTHER PUBLICATIONS

Chatterjee, et al. "Optimal MAC state switching for cdma2000 networks." Proceedings. Twenty-First Annual Joint Conference of the IEEE Computer and Communications Societies. vol. 1. IEEE, pp. 400-406. (Year: 2002).*
ETSI EN 303 470 v1.1.1 "Environmental Engineering (EE); Energy Efficiency measurement methodology and metrics for servers", pp. 1-35. (Year: 2019).*
Sivaraman, Hari, et al. "TECN: Task Selection and Placement in GPU Enabled Clouds Using Neural Networks." 2019 International Conference on High Performance Computing & Simulation (HPCS), pp. 890-896 (Year: 2019).*
Garg, Anshuj, et al. "Virtual Machine Placement solution for VGPU enabled Clouds." 2019 International Conference on High Performance Computing & Simulation (HPCS), pp. 897-903 (Year: 2019).*

\* cited by examiner

WORKLOAD PLACEMENT FOR VIRTUAL GPU ENABLED SYSTEMS

BACKGROUND

A cluster can include a collection of hosts in which processor, memory, storage, and other hardware resources are aggregated for utilization. A host is capable of running one or more virtual computing instances, such as virtual machines and other workloads. A workload can include an operating system (OS) running one or more applications that can utilize host resources. Placing workloads with graphics processing requirements within a datacenter with heterogeneous systems can pose a number of issues. The systems can have distinct types of accelerators: GPU, FPGA and application specific integrated circuits. A host machine in a datacenter may have one or more of these accelerators. Assignment of a workload to a host can depend on matching the requirements of the task to the available accelerators on the machine. If a workload has graphics processing requirements, it can be placed on a host with a graphics accelerator that meets the graphics processing demands of the workload.

Virtualized GPUs (vGPUs) present opportunities to improve resource utilization with the potential benefit of ease of management. While system administrators can choose a placement model for a vGPU-enabled system, the placement model can be efficient for one scenario while inefficient for others within an evolving heterogeneous datacenter. This can result in sub-optimal placement of virtual machines, unbalanced hosts, network saturation, overloading of network links, and inefficient utilization of available resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to workload placement in systems that include graphics processing units (GPUs) that are virtual GPU (vGPU) enabled. The vGPU enabled systems can include data centers, cloud computing services, and other computing environments. These systems can process vGPU requests of virtual machines and other workloads and assign the vGPU requests to GPUs in a vGPU enabled system. As a result, multiple workloads can use a vGPU enabled GPU at the same time. Existing systems can result in sub-optimal placement of workloads by selection of a placement model that is only effective for a particular count of GPUs or hardware configuration, vGPU scheduling policy, and workload arrival rate. However, the mechanisms described herein can result in efficient selection and placement of workloads on vGPUs for multiple hardware configurations, vGPU scheduling policies, and arrival rates.

Figure 1:
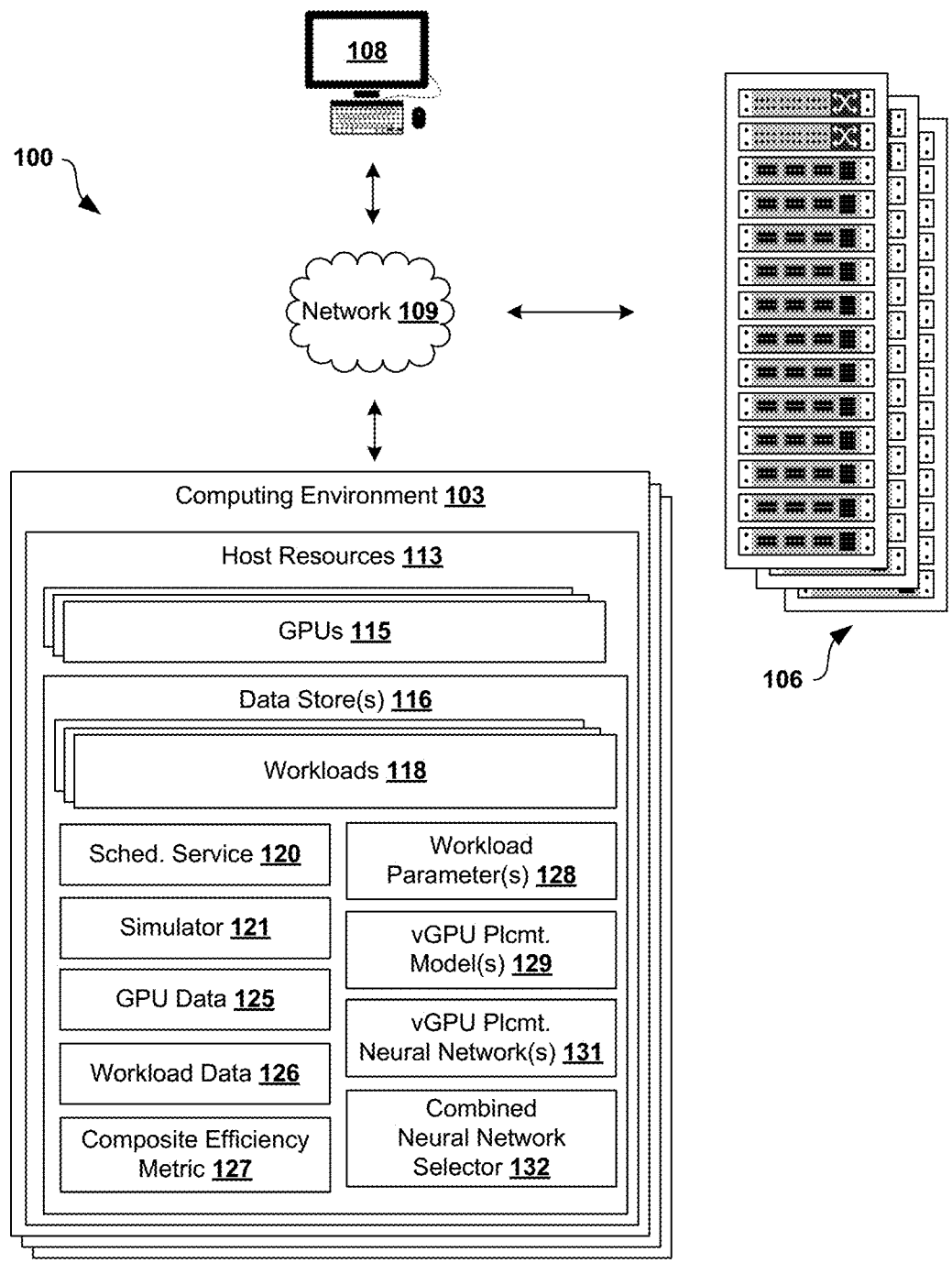
FIG. 1 is a block diagram illustrating an example of a networked environment that includes a computing environment, a client device, and other components in communication over a network.

With reference to FIG. 1, an example of a networked environment 100 is shown. The networked environment 100 can include a computing environment 103, various clusters 106, and one or more client devices 108 in communication with one another over a network 109. The network 109 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

The computing environment 103 can include host resources 113. The host resources 113 can include processors, GPUs 115, data stores 116, and other hardware resources installed in hosts or physical machines of the computing environment 103. In some examples, the computing environment 103 can include an enterprise computing environment that includes hundreds or even thousands of physical machines, virtual machines, and other software implemented in devices stored in racks, distributed geographically and connected to one another through the network 109. It is understood that any virtual machine or virtual appliance is implemented using at least one physical device.

The computing environment 103 can include, for example, a server or any other system providing computing capability and other host resources 113. Alternatively, the computing environment 103 can include one or more computing devices that are arranged, for example, in one or more server banks, computer banks, clusters, or other arrangements. The computing environment 103 can include a grid computing resource or any other distributed computing arrangement. The computing devices can be located in a single installation or can be distributed among many different geographical locations. Although shown separately from the clusters 106, in some examples, the clusters 106 can be a portion of the computing environment 103. Various applications can be executed on the computing environment 103. For example, a scheduling service 120 can be executed by the computing environment 103. Other applications, services, processes, systems, engines, or functionality not discussed in detail herein may also be executed or implemented by the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the clusters 106 and client devices 108 for end users over the network 109, sometimes remotely, the computing environment 103 can be described as a remote computing environment 103 in some examples. Additionally, in some examples, the computing environment 103 can be implemented in hosts of a rack of the computer clusters 106, and can manage operations of a virtualized computing environment.

The GPUs 115 can be vGPU-enabled, or support vGPUs. For example, NVIDIA® vGPU solutions can allow multiple virtual machines, containers, or workloads 118, to share a GPU 115 with a balance among performance, security and isolation. In vGPU mode or mediated pass-through mode, workloads 118 time-share the GPU 115 resources by time-slicing and hardware preemption based on vGPU-enabled architectures such as the NVIDIA® Pascal architecture. In any given time slice, only one workload 118 runs on a GPU 115. All GPU cores of the GPU 115 are given to this workload 118 during the time slice, even if it does not use all of the cores. The GPU internal memory can be statically partitioned based on a vGPU profile. For example, NVIDIA® Tesla P100 16 GB GPU 115 can support 1 GB, 2 GB, 4 GB, 8 GB, and 16 GB vGPU profiles. The profiles can equally divide the total GPU memory of the GPU 115 into sections or partitions according to the memory size of the vGPU profile. When configured with a 1 GB profile, an NVIDIA® Tesla P100 can support up to 16 workloads 118, each provided with 1 GB of the total 16 GBs of the NVIDIA® Tesla P100 GPU 115. The NVIDIA® Tesla P100 GPU 115 can support up to 8 workloads 118 using the 2 GB profile, 4 workloads 118 using the 4 GB profile, 2 workloads 118 using the 8 GB profile, and a single workload 118 using the 16 GB profile.

An NVIDIA® Tesla P40 24 GB GPU 115 can support 1 GB, 2 GB, 3 GB, 4 GB, 6 GB, 8 GB, 12 GB, and 24 GB vGPU profiles. When configured with a 1 GB profile, an NVIDIA® Tesla P40 can support up to 24 workloads 118, each provided with 1 GB of the total 24 GBs of the NVIDIA® Tesla P40 GPU 115. The NVIDIA® Tesla P40 GPU 115 can support up to 12 workloads 118 using the 2 GB profile, 8 workloads 118 using the 3 GB profile, 6 workloads 118 using the 4 GB profile, 4 workloads 118 using the 6 GB profile, 2 workloads 118 using the 12 GB profile, and a single workload 118 using the 24 GB profile.

NVIDIA® vGPU can include three policies that determine how time slices are allocated, including best effort, equal share, and fixed share. In best effort policy, each workload 118 can use GPU cycles until its time slice is over, or until its job queue is empty. That is, GPU cycles are distributed among all workloads 118 that are running CUDA applications. For equal share, the amount of cycles given to each vGPU 112 is determined by the current number of workloads 118, regardless of whether these workloads 118 are running CUDA or GPU-utilizing applications or not. For fixed share, the amount of cycles given to each vGPU 112 is determined by the total number of supported workloads 118 under the given profile, regardless if other workloads 118 are powered on or not. In some examples, the best-effort policy can be chosen while using the scheduling service 120.

The data store 116 can include memory of the computing environment 103, mass storage resources of the computing environment 103, or any other storage resources on which data can be stored by the computing environment 103. In some examples, the data store 116 can include one or more relational databases, object-oriented databases, hierarchical databases, hash tables or similar key-value data stores, as well as other data storage applications or data structures. The data stored in the data store 116, for example, can be associated with the operation of the various services or functional entities described below. For example, workloads 118, the scheduling service 120, GPU data 125, workload data 126, and vGPU placement models 129 can be stored in the data store 116.

The scheduling service 120 can work in conjunction with a hypervisor of a host in the computing environment 103 to assign vGPU requests of the workloads 118 to GPUs 115. Assignment of a vGPU request can cause the workload 118, or a portion of the workload 118, to be executed using a vGPU of a GPU 115. The scheduling service 120 can identify a graphics processing requirement for a workload 118 as a vGPU request that is to be executed or performed using the host resources 113. The scheduling service 120 can handle the graphics processing requirement or vGPU request of the workload 118 using a vGPU-enabled GPU 115. The scheduling service 120 can utilize the vGPU placement models 129 to optimize selection and placement of workload 118 vGPU requests to GPUs 115. The scheduling service 120 can work in conjunction with the hypervisor to generate a vGPU for the vGPU request, and assign the vGPU request or the associated workload 118 for execution using a vGPU-enabled GPU 115.

The vGPU placement models 129 can include first-come-first-serve (FCFS), longest-first, longest-wait-first, random, shortest-first, and bin-packing heuristic, among other vGPU placement models 129. The FCFS vGPU placement model 129 can, on each simulation or actual clock tick, try to place the first workload 118 in the wait queue, then the second, and so on. The longest-first vGPU placement model 129 can, on each clock tick, attempt to place the workload 118 with the longest run time first, then the one with the second longest run time, and so on. The longest-wait-first vGPU placement model 129 can, on each clock tick, try to place the workload 118 with the longest wait time first, then the one with the second longest wait time, and so on. The random vGPU placement model 129 can, on each clock tick, randomly select a workload 118 and try to place it, then it selects another one at random and so on. The shortest-first placement model 129 can, on each clock tick, try to place the workload 118 with the shortest run time first, then the one with the second shortest run time, and so on. Bin-Packing vGPU placement model 129 can, for each workload 118 in the arrival queue that can be placed on a GPU 115, compute the composite efficiency metric 127 if the workload 118 were to be placed. The computed composite efficiency metric 127 values are sorted and the workloads 118 with the highest composite efficiency metric 127 values are placed till available slots in the GPUs 115 are exhausted. Different vGPU placement models 129 show the best composite efficiency metric 127 for different configurations. For example, the random selection can show the best composite efficiency metric 127 when the problem is under constrained with a large GPU count and low arrival rates. The bin-packing heuristic can have better results with a small GPU count or high arrival rates. So, for a vGPU-enabled cloud with varying arrival rates or different number of available GPUs, a single heuristic or vGPU placement model 129 can be ineffective for all possible or likely configurations.

GPU data 125 can represent information related to GPUs 115, as well as related hardware resources 113. GPU data 125 can include information such as the amount of GPU memory of the GPU 115, a set of supported vGPU profiles for the GPU 115, and a GPU configuration status. The GPU configuration status can indicate whether or not the GPU 115 is currently configured with a particular vGPU profile. If the GPU 115 is configured, the configuration status can also indicate the configured vGPU profile of the GPU 115. GPU data 125 can also include information related to the workloads 118 currently executing on each GPU 115, as well as workloads 118 scheduled or slated to be executed. GPU data 125 can include a record of the workloads 118 assigned to each GPU 115. GPU data 125 can also include vGPUs of the GPUs 115. For each vGPU, the GPU data 125 can include a GPU memory reservation and availability status. The GPU memory reservation can be an amount of GPU memory of the vGPU, according to a configured vGPU profile of the associated GPU 115.

Workload data 126 can represent information related to workloads 118. Workload data 126 can include a record of all vGPU requests for the workloads 118. A vGPU request can include a graphics processing workload or graphics processing requirement of a workload 118. Workload data 126 can include an identifier or name of each workload 118, and an identifier or location of a GPU 115 where a vGPU request or workload 118 is being processed or executed.

A composite efficiency metric 127 can be used to compare different workload or vGPU placement models 129 to select and place jobs, tasks, or workloads 118 on GPUs 115. The composite efficiency metric 127 can include a product of Utilization of the GPUs 115 and time spent by a workload 118 waiting for a GPU 115 to become available. Specifically, in a system with 'r' GPUs, the Utilization, 'U', of the GPUs can be expressed as $$U = \frac{1}{r}\left(\sum_{i=1}^{r} \frac{R_c^i}{C}\right),$$

and $0 \leq U \leq 1$, where $R_c^i$=Busy cycles for RunQ, $R^i$ and C=Total # simulation cycles.

The metric, 'time spent waiting' should be minimized for an optimal solution. To make this a maximization problem, this metric can be utilized by defining a ratio E of time spent executing to the total time spent in the system, which can be expressed as $$E = \left(\frac{\sum_{i=1}^{m} J_r^i}{\sum_{i=1}^{m} (J_r^i + J_w^i)}\right),$$

and $0 \leq E \leq 1$, where $J_r^i$=Cycles in RunQ, r for task, $J^i$, and $J_w^i$=Cycles in WaitQ for task, $J^i$.

The term $J_r^i$ can depend on a number of cycles during which the jobs/task was executing, not just the number of cycles for which the workload 118 was in the GPU queue. This distinction is valuable because when a GPU is multiplexed among many workloads 118 only one workload 118 executes at a time and it does not execute when the current time slice does not belong to it. Further, the different GPU scheduling policies can handle time slices differently as explained earlier. In other words, a fixed-share scheduling policy for a GPU 115 can have a different value for this ratio than a best-effort scheduling policy because many time-slices could be left idle with fixed-share scheduling as compared to best-effort scheduling. If a workload 118 is suspended and subsequently resumed, the clock cycles spent during the suspend and the resume operations can be included in the term, $J_r^i$. The time between completion of suspend and the start of resume is spent in the waiting queue and can be included in the term $J_w^i$. The composite efficiency metric 127, or CEM, can be defined as E=½ (U×E), and $0 \leq CEM \leq 1$. As a result, CEM calculations based on simulated or live workloads can be utilized to rank the available vGPU placement models 129, train vGPU placement neural networks 131 such as dense neural networks (DNNs). The vGPU placement neural networks 131 and combinations of multiple vGPU placement neural networks 131 can also maximize the CEM criterion for selection and placement of live workloads 118 on GPUs 115 of the computing environment 103. Maximizing the composite efficiency metric 127 can maximize the utilization of GPUs 115 while minimizing wait time. From a cloud service provider's perspective, this can improve utilization efficiency of existing hardware as compared to existing placement methods, increase revenue, and improve customer satisfaction.

Workload parameters 128 can include parameters related to live or simulated execution of a workload 118 in the computing environment 103. The workload parameters 128 can be provided as input parameters for a vGPU placement neural network 131 in order to select and place a workload 118 on a vGPU-enabled GPU 115. Workload parameters 128 can include, or be generated using, the GPU data 125, workload data 126, composite efficiency metric 127, and other information. For example, workload parameters 128 can include:

1. The composite efficiency metric 128 for a workload 118 scaled by the geometric mean of the composite efficiency metric 128 for all the workloads 118 currently on the arrival queue.
2. The workload type of the workload 118. A workload 118 can include a type or classification associated with a purpose or activity related to the workload. For example, workload types can include machine learning inference workload type, machine learning training workload type, computer aided drafting (CAD) workload type, and other types of workloads 118.
3. Minimum graphics memory required for the workload 118. This minimum graphics parameter can be expressed as a fraction of the maximum Pascal DRAM of a particular GPU 115. For example, a fraction of 24 GB for a 24 GB GPU 115.
4. Time a workload 118 has spent being suspended in the computing environment 103.
5. Time a workload 118 has spent being resumed in the computing environment 103.
6. Time spent in the arrival queue, or wait time a workload 118 spends prior to being placed in the computing environment 103.
7. Time a workload 118 has spent executing thus far.
8. Run time remaining before a workload 118 completes or is expected to complete.
9. Product of "wait time" and run time remaining before a workload 118 completes.
10. GPU DRAM requested by the workload 118 as a fraction of total available GPU DRAM in the vGPU cloud or computing environment 103.
11. Approximate estimate of the probability of selection and placement of the workload 118.
12. Accurate estimate of the probability of selection and placement of the workload 118.

The workload parameters 128 provided as input parameters to a vGPU placement neural network 131 can include all or a subset of these workload parameters 128. The example workload parameters 128 are provided for illustrative purposes, and are not intended as an exhaustive list.

A combined neural network selector 132, or a combined neural-network-based vGPU workload selector, can be generated by configuring, training, and combining vGPU placement neural networks 131. Specific vGPU placement neural networks 131 are discussed further below. The vGPU placement neural networks 131 can be combined in a number of ways into a combined neural network selector 132. For example, the combined neural network selector 132 can be generated based on a logical-OR combination operation or a scaled add combination operation performed using trained vGPU placement neural networks 131.

A logical-OR combined neural network selector can take a prediction vector for each of a number of vGPU placement neural networks 131. If any one vGPU placement neural network 131 selects a workload 118, the logical-OR combined selector can select and place that task on a GPU 115 queue. While the logical-OR combined selector can be simple, it tends to mark more tasks as selected than there are places available in the cloud.

A scaled-add combined neural network selector can multiply the prediction vector for each of the vGPU placement neural networks 131 by a precision of that vGPU placement neural network 131. This scales each prediction vector by the probability that a workload 118 marked selected by a vGPU placement neural network. The scaled prediction vectors for the vGPU placement neural networks 131 or DNNS are then added, and rounded or and clipped to the range [0, 1]. This has the effect of setting every value at and below 0.5 to 0 and every value greater than 0.5 to 1, no matter how large it might be. So, even the maximum possible value of 3.0 is forced to 1. The scaled-add combined selector of combining the prediction vectors never generates more selected workloads 118 than there are places in the vGPU enabled cloud, so the scaled-add combined prediction vector can be implemented unpruned. Either DNN-based selector can be implemented in a live datacenter to select workloads 118 and place on vGPU-enabled GPUs 115, for example, in GPU queue of a vGPU-enabled GPU 115.

A hypervisor, which may sometimes be referred to as a virtual machine monitor (WM), can be an application or software stack that allows for creating and running workloads 118, and performing the workloads 118 using hardware resources of the computing environment 103. The scheduling service 120 can work in conjunction with the hypervisor to execute the workloads 118 on hardware resources that include the GPUs 115. A vGPU manager component can be installed and executed in the hypervisor layer and can virtualize the underlying physical GPUs 115. For example GPUs 115, including NVIDIA® Pascal and others, can offer virtualization for both graphics and GPGPU (CUDA) applications.

A hypervisor can be configured to provide guest operating systems with a virtual operating platform, including virtualized hardware devices or resources, and to manage the execution of guest operating systems within a virtual machine execution space provided on the host machine by the hypervisor. In some instances, a hypervisor can be a type 1 or bare metal hypervisor configured to run directly on a host machine in order to control and manage the hardware resources 153. In other instances, the hypervisor can be a type 2 or hosted hypervisor implemented as an application executed by an operating system executed by a host machine. Examples of different types of hypervisors include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

The scheduling service 120 can train vGPU placement neural networks 131 by analyzing results from live workloads 118 or results from a simulator 121 that simulates selection and placement of workloads 118 on vGPU-enabled GPUs 115. The simulator 121 can include two logical components. One component can generate workloads 118 to be placed on a GPU 115. The second component can model a vGPU cloud as a set of queues and model the placement of workloads 118 in the simulated vGPU cloud using any one of the vGPU placement models 129 or vGPU placement neural networks 131 under consideration. The load generator component can generate workloads 118 using a user-provided or simulated arrival rate parameter, lambda. The simulator 121 can assume that the inter-arrival time between workloads 118 is exponentially distributed. Each time a job is created, the simulator 121 can put it in one of a predetermined set of workload categories or types using a uniform distribution or another distribution.

The workload categories can include a machine learning inference workload type, machine learning training workload type, and CAD workload type, among others. Machine learning inference workloads 118 can perform inference using a machine learning model that has been trained. Machine learning training workloads 118 can train a machine learning model to complete a task or decision. CAD workloads 118 can be those that run CAD software. Additional workloads 118 can be other interactive user interface type workloads 118, which can generally behave as discussed for CAD workloads 118. Each of these categories has distinct characteristics.

The machine learning inference workloads 118 can include a run-time less than one second and request either a P40-12Q or a P40-24Q profile. The machine learning training workloads 118 request a P40-12Q or a P40-24Q profile, and can have a run time of forty-five minutes, for convolutional neural network (CNN) jobs, to six hours for recurrent neural network (RNN) jobs. CAD workloads 118 can be interactive workloads that provide a user interface for a user or simulated user actions. Since CAD workloads can be user-driven, they can be created between 8 AM and 10 AM each day and complete between 4 PM and 6 PM. The profile request for CAD workloads 118 can be uniformly distributed over all available P40 profiles or other available profiles. The profile associated with a workload 118 is an important constraint on when and where it can be placed. Machine learning training workloads 118 can be considered "batch" jobs, which can be "suspended" and "resumed" as needed to make space for other workloads 118. A suspend resume model or rule can be utilized to decide when to "suspend" and "resume" machine learning training workloads 118. Machine learning training workloads 118 are run only when they do not compete with CAD workloads 118 for vGPUs. The simulator 121 can include one or more arrival queues for arriving workloads 118 requesting vGPU of the GPUs 115.

Once the simulator 121 creates workloads 118 using an exponential distribution with a predetermined or user defined inter-arrival rate, they are placed into one of the three categories described above using a uniform random variable. The arrival rate can be varied or changed periodically for a simulation, or for further training. In some examples, there can be a probability of 50% for a job created between 8 am-10 am to be a machine learning inference workload 118, otherwise it can be a CAD workload 118. Outside this time window, a job can be a machine learning inference workload 118 with 98% probability and with 2% probability to be a machine learning training workload 118. These probabilities are for illustrative purposes, and can be in any distribution. Once a workload 118 has been created, it can be enqueued in an arrival queue. On every simulation clock tick, one or more workloads 118 can be selected from the arrival queue using a vGPU placement model 129 and placed into one of several GPU queues; one GPU queue for each GPU 115 in the simulated cloud. The GPU count or number of GPUs 115 in the cloud can be predetermined or selected by a user when the simulation is started. Each GPU queue can include the list of workloads 118 currently being executed by vGPUs of a GPU 115.

Since the Nvidia vGPU solution supports multiple vGPU profiles, each with a different maximum number of workloads 118, the size of a GPU queue is limited by the maximum number of workloads 118 (or virtual machines since each workload 118 can run in its own virtual machine) that can be accommodated at a configured vGPU profile. The vGPU profile of a GPU queue is defined by the vGPU profile of the first workload 118 that is scheduled on that queue. Workloads 118 that arrive second, third or later at a GPU queue may join the queue only if two conditions are both satisfied: The vGPU profile of the incoming workload 118 matches the vGPU profile of the GPU queue. The current length of the GPU queue is strictly less than the maximum allowed number of jobs (VMs) for the GPU queue's profile. Once a GPU queue empties out because the GPU has completed all the jobs assigned to it, its profile can be forgotten.

The GPU queue will not have any profile till a workload 118 is assigned to it, at which time it assumes the profile of that workload 118. Another way to erase the profile of a GPU queue is to suspend all the workloads 118 on that GPU queue thereby emptying it out and clearing its profile. This mechanism of erasing the profile of a GPU queue creates another dimension to be handled by placement algorithms. Suspending and subsequently resuming jobs as a placement technique can be used in two different ways. First, one or more jobs can be suspended to make way on a GPU queue for an incoming workload 118 with the same vGPU profile. Second, all the workloads 118 on a GPU queue can be suspended to make way for any new workload 118, regardless of its vGPU profile. These two dynamic suspend-resume techniques allow placement algorithms significant flexibility at the cost of increased complexity. Once a workload 118 has been placed on a GPU queue, the GPU 115 controls its execution using one of three different scheduling policies including fixed-share scheduling, equal-share scheduling, and best effort scheduling. The policy that is used in a simulation is predetermined or selected by a user, and can be varied or changed for further simulation.

The simulator 121 can run simulations using each of the vGPU placement models 129 while varying the workloads 118 as discussed, and for various numbers of GPUs 115, arrival rates, and GPU scheduling policies. The resulting GPU data 125 and workload data 126 for each of the vGPU placement models 129 can be used to train vGPU placement neural networks 131. While data from a simulation can be utilized, live workload data 126 and live GPU data 125 from actual workloads performed for an enterprise can also be analyzed and used to train vGPU placement neural networks 131. The vGPU placement neural networks 131 can be combined to generate a combined neural network selector 132.

Figure 2:
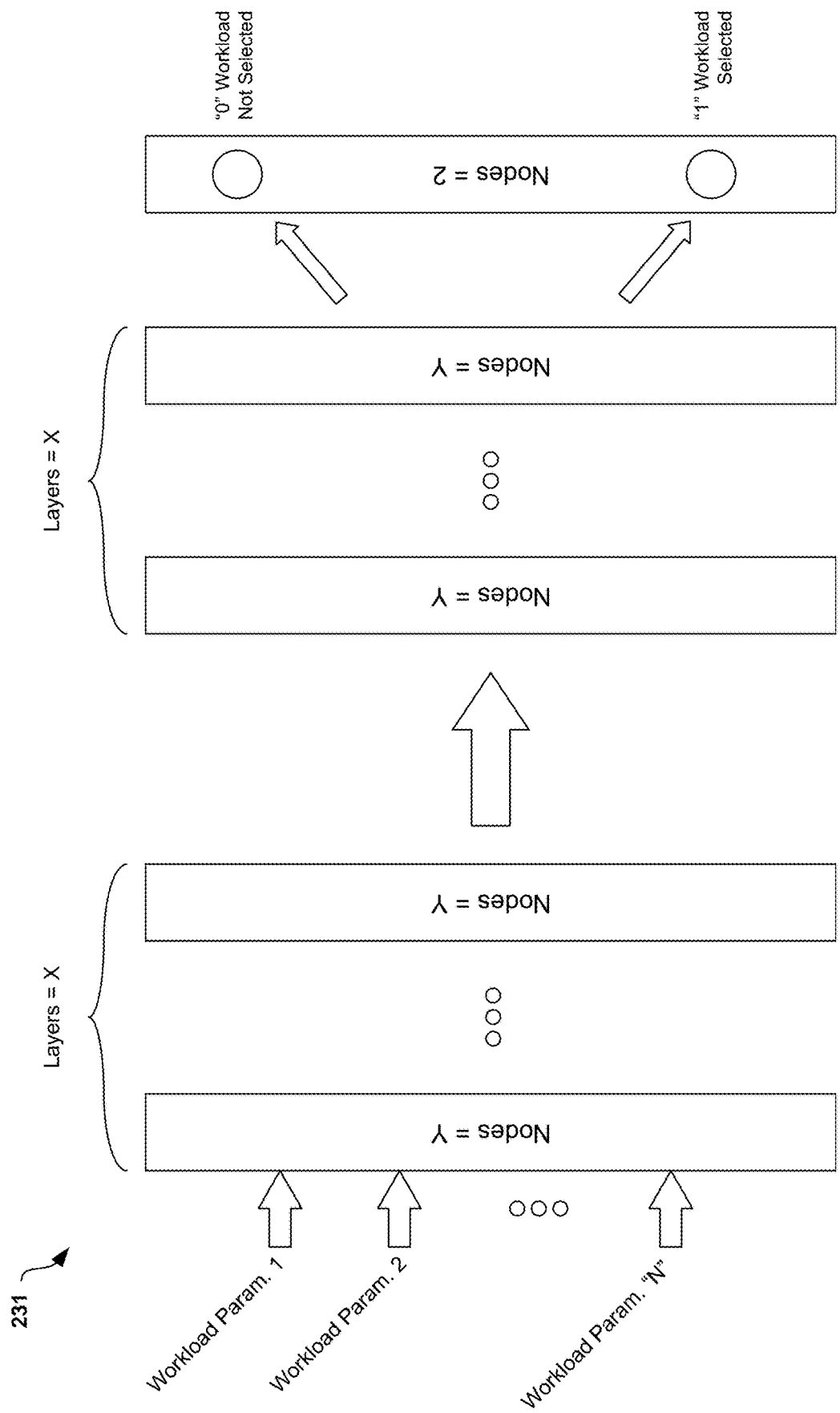
FIG. 2 is a drawing that illustrates an example neural network configuration utilized by components of the networked environment.

FIG. 2 is a drawing that illustrates an example neural network configuration 231 for a vGPU placement neural network 131. The neural network configuration 231 can be a configuration for a dense neural network, or another type of vGPU placement neural network 129. The neural network configuration 231 can include two sets of "X" layers, where each layer includes "Y" nodes. The neural network configuration 231 can take "N" workload parameters 128 as inputs, and can output a decision of whether to select a workload 118 for placement on a vGPU-enabled GPU 115 based on the trained vGPU placement neural network 131 having the neural network configuration 231. In some examples, the number of layers can be X=4, and the number of nodes can be Y=48. The input parameters can include all or a subset of the twelve workload parameters 128 discussed above.

Figure 3:
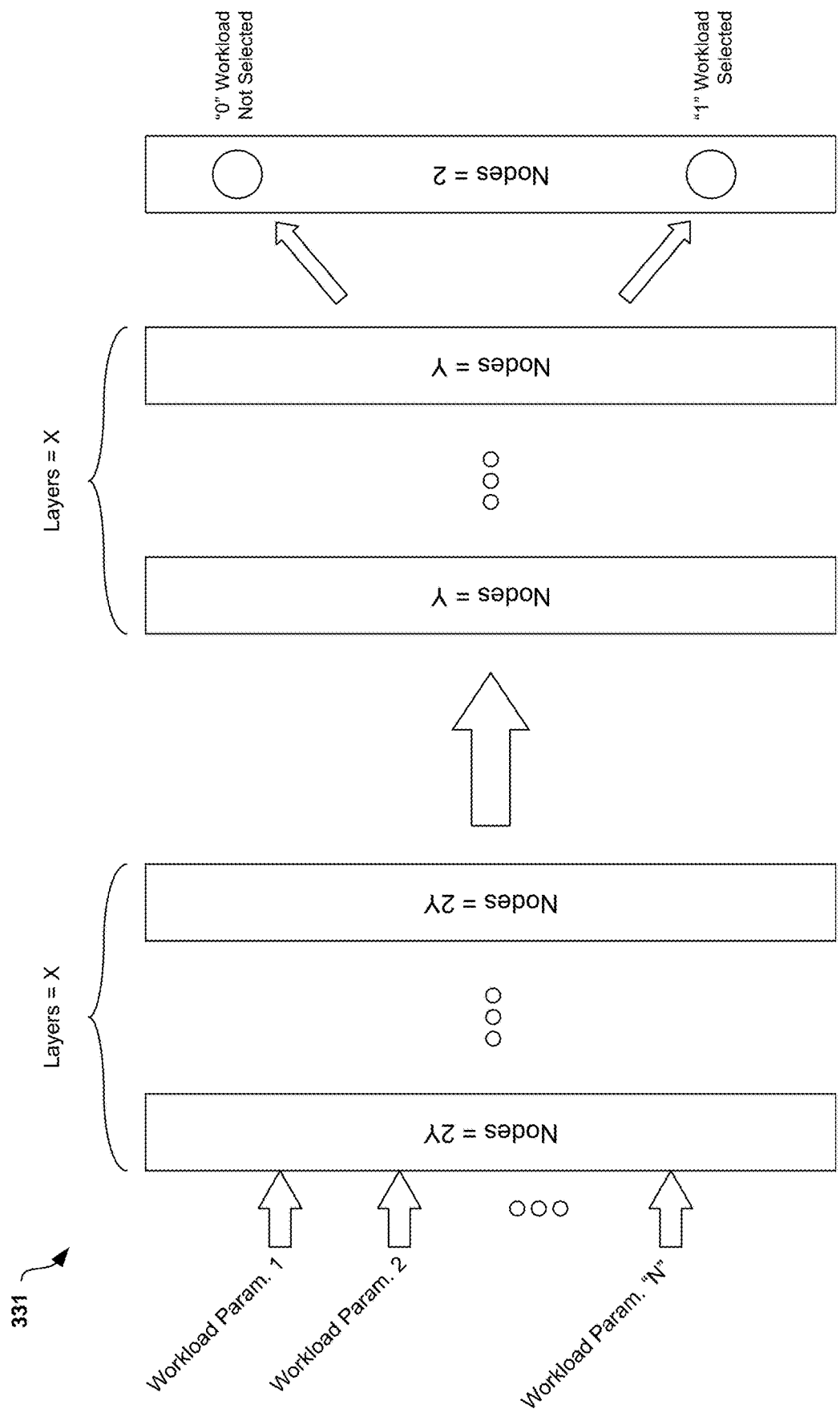
FIG. 3 is a drawing that illustrates an example neural network configuration utilized by components of the networked environment.

FIG. 3 is a drawing that illustrates an example neural network configuration 331 for a vGPU placement neural network 131. The neural network configuration 331 can be a configuration for a dense neural network, or another type of vGPU placement neural network 129. The neural network configuration 331 can include two sets of "X" layers. A set of X input layers can feed a set of X output layers. Each layer of the input layers can include "2Y" nodes. Each layer of the output layers can include "Y" nodes. The neural network configuration 331 can take "N" workload parameters 128 as inputs, and can output a decision of whether to select a workload 118 for placement on a vGPU-enabled GPU 115 based on the trained vGPU placement neural network 131 having the neural network configuration 331. In some examples, the number of layers can be X=4, and the number of nodes can be Y=24, so that each of the input layers includes 48 nodes, and each of the output layers includes 24 nodes. The input parameters can include all or a subset of the twelve workload parameters 128 discussed above.

Figure 4:
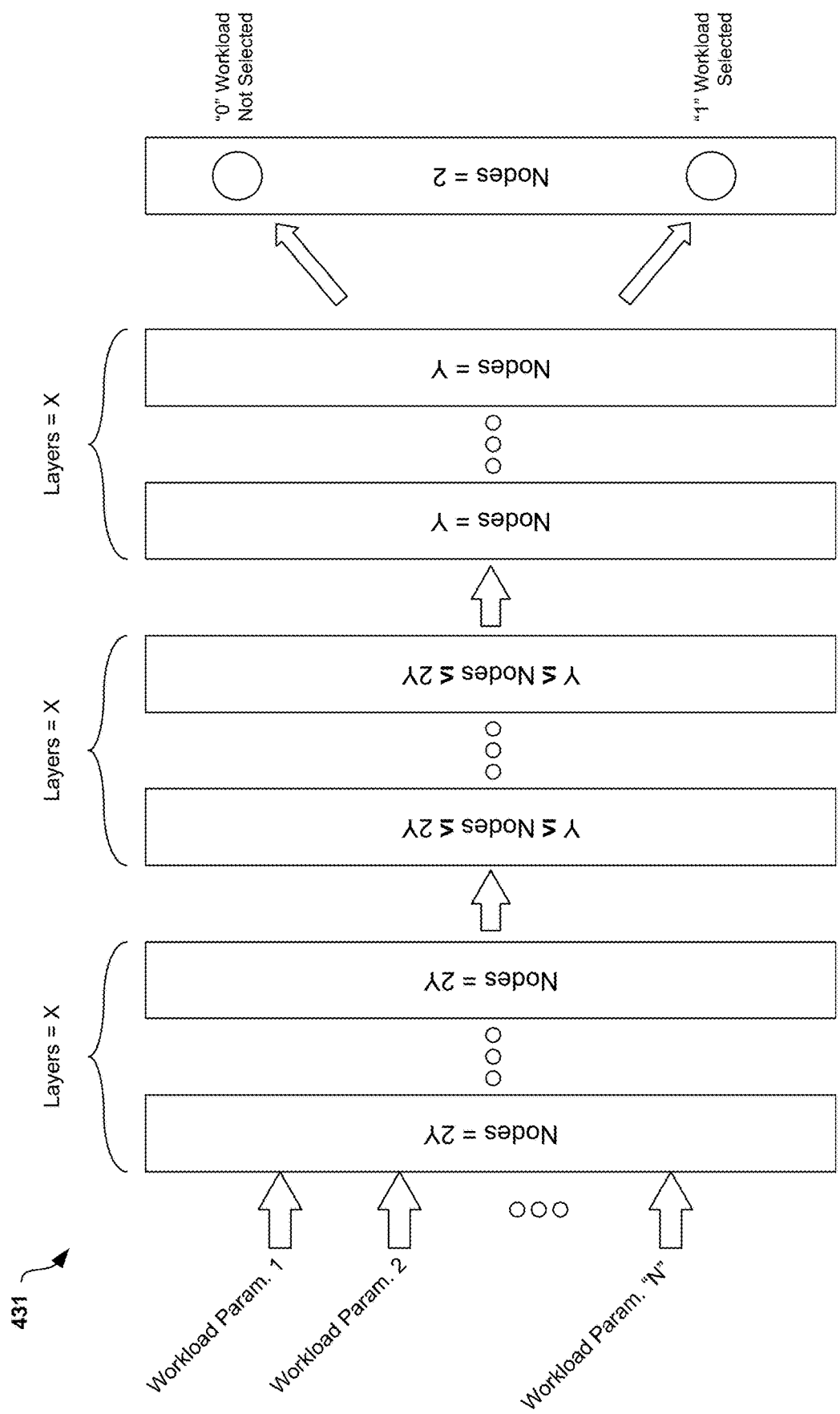
FIG. 4 is a drawing that illustrates an example neural network configuration utilized by components of the networked environment.

FIG. 4 is a drawing that illustrates an example neural network configuration 431 for a vGPU placement neural network 131. The neural network configuration 431 can be a configuration for a dense neural network, or another type of vGPU placement neural network 129. The neural network configuration 431 can include three sets of "X" layers. A set of X input layers can feed a set of X intermediate layers, which can feed a set of X output layers. Each layer of the input layers can include "2Y" nodes. Each layer of the output layers can include "Y" nodes. Each layer of the intermediate layers can include a number of nodes that is greater than or equal to Y and less than or equal to 2Y. The neural network configuration 431 can take "N" workload parameters 128 as inputs, and can output a decision of whether to select a workload 118 for placement on a vGPU-enabled GPU 115 based on the trained vGPU placement neural network 131 having the neural network configuration 431. In some examples, the number of layers can be X=4, and the number of nodes can be Y=48, so that each of the input layers includes 96 nodes, and each of the output layers includes 48 nodes. In this example, each of the intermediate layers can include 64 nodes, or any number of nodes from 48 to 96. The input parameters can include all or a subset of the twelve workload parameters 128 discussed above.

Figure 5:
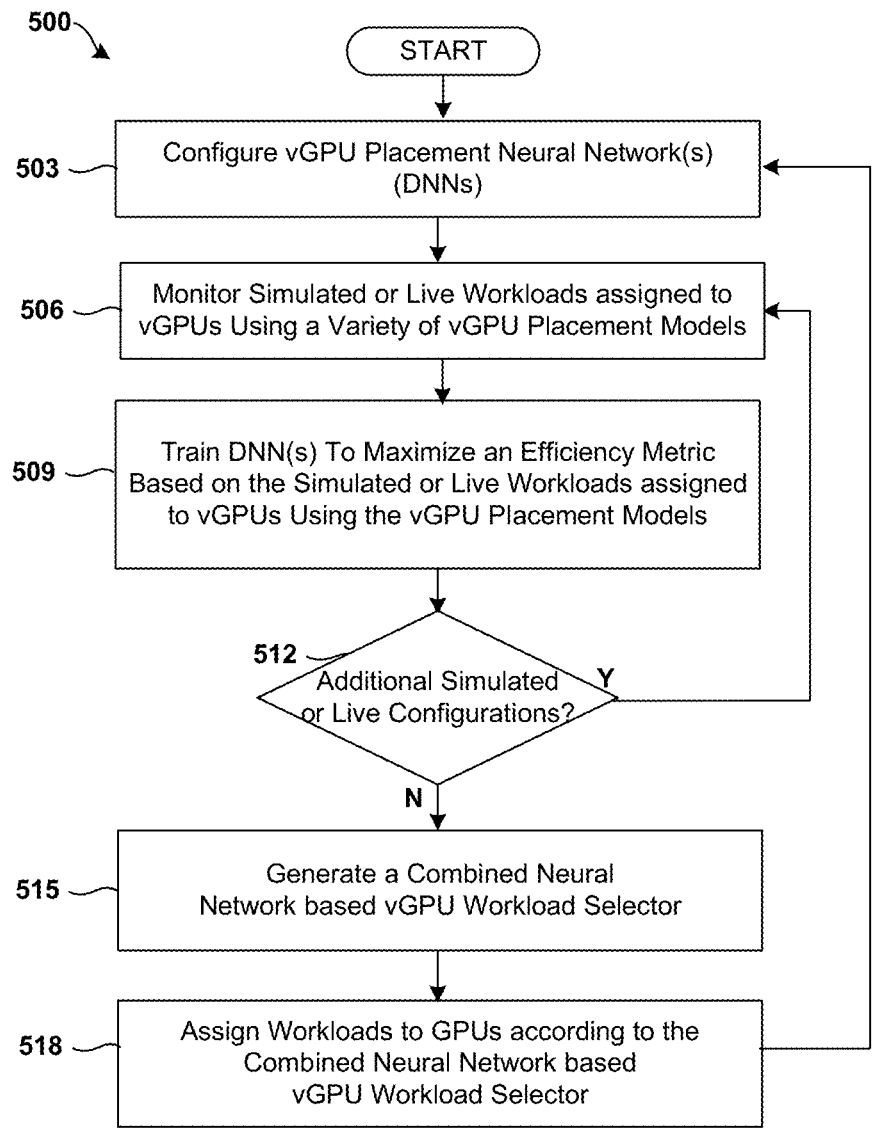
FIG. 5 is a flowchart that illustrates an example of functionalities performed using components of the networked environment.

FIG. 5 shows an example flowchart 500, describing steps that can be performed by instructions executed by the computing environment 103. Generally, the flowchart 500 describes how the scheduling service 120 and other instructions of the computing environment 103 can optimize selection and placement of workloads 118 on vGPU-enabled GPUs 115, according to a vGPU placement neural network 131 or a combined neural network selector 132.

In step 503, the scheduling service 120 can configure vGPU placement neural networks 131. The scheduling service 120 can generate one or more configurations for vGPU placement neural networks 131. For example, the scheduling service 120 can generate the neural network configuration 231, the neural network configuration 331, and the neural network configuration 431.

In step 506, the scheduling service 120 can monitor simulated or live workloads 118 assigned to vGPUs using a variety of vGPU placement models 129. In the example of simulated workloads 118, the simulator 121 can create workloads 118 with an exponential distribution and according to a predetermined set of probabilities. For each of the vGPU placement models, the simulator 121 can run for a predetermined amount of time, according to a predetermined arrival rate and a predetermined GPU count to identify GPU data 125 and workload data 126. GPU data 125 can include information such as the amount of GPU memory of the GPU 115, a set of supported vGPU profiles for the GPU 115, and a GPU configuration status. The GPU configuration status can indicate whether or not the GPU 115 is currently configured with a particular vGPU profile. If the GPU 115 is configured, the configuration status can also indicate the configured vGPU profile of the GPU 115. GPU data 125 can also include information related to the workloads 118 currently executing on each GPU 115, as well as workloads 118 scheduled or slated to be executed. GPU data 125 can include a record of the workloads 118 assigned to each GPU 115. GPU data 125 can also include vGPUs of the GPUs 115. For each vGPU, the GPU data 125 can include a GPU memory reservation and availability status.

Workload data 126 can include an identifier or name of each workload 118, and an identifier or location of a GPU 115 where a vGPU request or workload 118 is being processed or executed. The workload data 126 can include a workload type for each workload 118 executed in the computing environment, as well as its current execution time, expected execution time, actual total execution time once completed, wait time prior to placement, suspended time, as well as each of the workload parameters 128.

In step 509, the scheduling service 120 can train DNNs or vGPU placement neural networks 131 to maximize a composite efficiency metric 127 based on the simulated or live workloads 118 assigned to vGPUs using the vGPU placement models 129. In other words, the scheduling service 120 can train vGPU placement neural networks 131 to maximize the composite efficiency metric 127 using the GPU data 125 and the workload data 126. Each of the vGPU placement neural networks 131 can be trained using this information.

In step 512, the scheduling service 120 can determine whether additional simulated or live configurations are required. Following the simulated example, the GPU count in the computing environment 103 can be varied over a number of predetermined values including 3, 4, 6, 8, 9, 12, 16, 20, and 24. Additional GPUs 115 can also be added to the simulation. Arrival rate can be varied from 20 arrivals per hour to 576 or more arrivals per hour in twelve or more steps. The simulator 121 can simulate activity for 1 day, 2 days, 4 days, 7 days, and other predetermined time periods. If additional configurations remain to be simulated then the process can make configuration changes and move to step 506. For live workload 118 configurations, the scheduling service 120 can move to step 506 and monitor live workloads 118 until a predetermined set of a variety of different situations are experienced. No additional simulated or live configurations are required, then the training of the vGPU placement neural networks 131 can be considered complete, and the process can move to step 515.

In step 515, the scheduling service 120 can generate a combined neural network based on a vGPU workload selector, such as the combined neural network selector 132, using the trained vGPU placement neural networks 131. The combined neural network selector 132 can be generated based on a logical-OR combination operation, or a scaled add combination operation performed using trained vGPU placement neural networks 131.

A logical-OR combined neural network selector 132 can take a prediction vector for each of a number of vGPU placement neural networks 131. If any one vGPU placement neural network 131 selects a workload 118, the logical-OR combined selector can select and place that task on a GPU 115 queue. While the logical-OR combined selector can be simple, it tends to mark more tasks as selected than there are places available in the cloud.

A scaled-add combined neural network selector 132 can multiply the prediction vector for each of the vGPU placement neural 131 by a precision of that vGPU placement neural network 131. This scales each prediction vector by the probability that a workload 118 marked selected by a vGPU placement neural network. The scaled prediction vectors for the vGPU placement neural networks 131 are then added, and rounded and/or clipped to the range [0, 1], resulting in the scaled-add combined neural network selector 132.

In step 518, the scheduling service 120 can implement the combined neural network selector 132 for selection and placement of workloads 118 on a vGPU-enabled GPU 115. For example, the scheduling service 120 can identify vGPU requests for workloads 118 based on a live arrival queue. The scheduling service 120 can utilize current GPU data 125 and workload data 126 to identify required workload parameters 128. The workload parameters 128 can be input into the combined neural network selector 132. Using the combined neural network selector 132 can also indicate that the workload parameters 128 are input into the individual vGPU placement neural networks, and their outputs can be combined to select one or more workloads 118 for placement. Thus, the scheduling service 120 can select one or more workloads 118 for placement according to the combined neural network selector 132. The selected workloads 118 can be placed in a GPU queue of a vGPU-enabled GPU 115. The GPU 115 can execute the workload 118.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drives, solid-state drives, USB flash drives, memory cards, optical discs such as compact discs (CDs) or digital versatile discs (DVDs), floppy disks, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The flowchart shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or in machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowchart shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system comprising a computing environment comprising a cluster of computing devices that provide host resources comprising a plurality of virtual graphics processing unit (vGPU)-enabled graphic processing units (GPUs) and at least one data store, wherein the at least one data store includes: plurality of workloads, a scheduling service, a simulator, a plurality of vGPU placement models, and a plurality of vGPU placement neural networks, a respective vGPU placement neural network comprising two or more sets of layers, and wherein the at least one data store comprises instructions that when executed by at least one processor of at least one computing device of the cluster, cause the scheduling service to at least:

generate a plurality of configurations for the plurality of vGPU placement neural networks;

identify GPU data and workload data by monitoring workloads executed or simulated on the vGPU-enabled GPUs based at least in part on the plurality of vGPU placement models, wherein the GPU data and the workload data for a respective vGPU placement model are generated based at least in part on placing the workloads in different datacenter configurations comprising a plurality of different arrival rates and a plurality of different GPU counts;

train the plurality of vGPU placement neural networks to maximize a composite efficiency metric of a respective workload based on the GPU data and the workload data;

generate, for at least one candidate workload selected from the workloads, a respective prediction vector using a respective vGPU placement neural network of the plurality of vGPU placement neural networks, wherein the respective vGPU placement neural network is associated with a precision value;

generate a scaled-add combined neural network selector that multiplies the respective prediction vector by the precision value of the respective vGPU placement neural network; and utilize the scaled-add combined neural network selector to select a particular workload of the at least one candidate workload to execute using at least one of the vGPU-enabled GPUs.

2. The system of claim 1, wherein the workloads with the highest values for the composite efficiency metric are placed till available slots in the vGPU-enabled GPUs are exhausted.

3. The system of claim 1, wherein the plurality of vGPU placement models comprise at least one of a first-come-first-serve (FCFS) vGPU placement model, a longest-first vGPU placement model, a longest-wait-first vGPU placement model, a random vGPU placement model, a shortest-first vGPU placement model, and a bin-packing heuristic vGPU placement model.

4. The system of claim 1, wherein the scaled-add combined neural network selector combines the plurality of vGPU placement neural networks based on a scaled-add combination operation.

5. The system of claim 1, wherein the composite efficiency metric is based on GPU utilization and time a workload waits prior to selection for placement.

6. The system of claim 1, wherein the scheduling service provides the scaled-add combined neural network selector with inputs comprising a measure of the composite efficiency metric calculated for a workload scaled by a geometric mean of the composite efficiency metric calculated for a respective one of a plurality of workloads currently in an arrival queue awaiting selection for placement.

7. The system of claim 1, wherein at least one of the plurality of vGPU placement neural networks comprises at least two sets of layers, a respective set comprising four layers, a respective layer comprising at least twenty-four nodes.

8. A method performed by a scheduling service executed in a computing environment comprising a cluster of computing devices that provide host resources comprising a plurality of virtual graphics processing unit (vGPU)-enabled graphic processing units (GPUs) and at least one data store, wherein the at least one data store includes: plurality of workloads, the scheduling service, a simulator, a plurality of vGPU placement models, and a plurality of vGPU placement neural networks, a respective vGPU placement neural network comprising two or more sets of layers, the method comprising:
generating a plurality of configurations for a plurality of vGPU placement neural networks;
identifying GPU data and workload data by monitoring workloads executed or simulated on the vGPU-enabled GPUs based at least in part on the plurality of vGPU placement models, wherein the GPU data and the workload data for a respective vGPU placement model are generated based at least in part on placing the workloads in different datacenter configurations comprising a plurality of different arrival rates and a plurality of different GPU counts;
training the plurality of vGPU placement neural networks to maximize a composite efficiency metric of a respective workload based on the GPU data and the workload data;
generating, for at least one candidate workload selected from the workloads, a respective prediction vector using a respective vGPU placement neural network of the plurality of vGPU placement neural networks, wherein the respective vGPU placement neural network is associated with a precision value;
generating a scaled-add combined neural network selector that multiplies the respective prediction vector by the precision value of the respective vGPU placement neural network; and
utilizing the scaled-add combined neural network selector to select a particular workload of the at least one candidate workload to execute using at least one of the vGPU-enabled GPUs.

9. The method of claim 8, wherein the workloads with the highest values for the composite efficiency metric are placed till available slots in the vGPU-enabled GPUs are exhausted.

10. The method of claim 8, wherein the plurality of vGPU placement models comprise at least one of a first-come-first-serve (FCFS) vGPU placement model, a longest-first vGPU placement model, a longest-wait-first VGPU placement model, a random vGPU placement model, a shortest-first vGPU placement model, and a bin-packing heuristic vGPU placement model.

11. The method of claim 8, wherein the scaled-add combined neural network selector combines the plurality of vGPU placement neural networks based on a scaled-add combination operation.

12. The method of claim 8, wherein the composite efficiency metric is based on GPU utilization and time a workload waits prior to selection for placement.

13. The method of claim 8, wherein the scheduling service provides the scaled-add combined neural network selector with inputs comprising a measure of the composite efficiency metric calculated for a workload scaled by a geometric mean of the composite efficiency metric calculated for a respective one of a plurality of workloads currently in an arrival queue awaiting selection for placement.

14. The method of claim 8, wherein at least one of the plurality of vGPU placement neural networks comprises at least two sets of layers, a respective set comprising four layers, a respective layer comprising at least twenty-four nodes.

15. A non-transitory computer-readable medium comprising machine readable instructions performed by a scheduling service executed in a computing environment comprising a cluster of computing devices that provide host resources comprising a plurality of virtual graphics processing unit (vGPU)-enabled graphic processing units (GPUs) and at least one data store, wherein the at least one data store includes: plurality of workloads, the scheduling service, a simulator, a plurality of vGPU placement models, and a plurality of vGPU placement neural networks, a respective vGPU placement neural network comprising two or more sets of layers, wherein the instructions, when executed by at least one processor, cause the scheduling service to at least:
generate a plurality of configurations for the plurality of vGPU placement neural networks;
identify GPU data and workload data by monitoring workloads executed or simulated on vGPU-enabled GPUs based at least in part on the plurality of vGPU placement models, wherein the GPU data and the workload data for a respective vGPU placement model are generated based at least in part on placing the workloads in different datacenter configurations comprising a plurality of different arrival rates and a plurality of different GPU counts;
train the plurality of vGPU placement neural networks to maximize a composite efficiency metric of a respective workload based on the GPU data and the workload data;
generate, for at least one candidate workload selected from the workloads, a respective prediction vector using a respective vGPU placement neural network of the plurality of vGPU placement neural networks, wherein the respective vGPU placement neural network is associated with a precision value;
generate a scaled-add combined neural network selector that multiplies the respective prediction vector by the precision value of the respective vGPU placement neural network; and
utilize the scaled-add combined neural network selector to select a particular workload of the at least one candidate workload to execute using at least one of the vGPU-enabled GPUs.

16. The non-transitory computer-readable medium of claim 15, wherein the workloads with the highest values for the composite efficiency metric are placed till available slots in the vGPU-enabled GPUs are exhausted.

17. The non-transitory computer-readable medium of claim 15, wherein the plurality of vGPU placement models comprise at least one of a first-come-first-serve (FCFS) vGPU placement model, a longest-first vGPU placement model, a longest-wait-first vGPU placement model, a random vGPU placement model, a shortest-first vGPU placement model, and a bin-packing heuristic vGPU placement model.

18. The non-transitory computer-readable medium of claim 15, wherein the scaled-add combined neural network selector combines the plurality of vGPU placement neural networks based on a scaled-add combination operation.

19. The non-transitory computer-readable medium of claim 15, wherein the composite efficiency metric is based on GPU utilization and time a workload waits prior to selection for placement.

20. The non-transitory computer-readable medium of claim 15, wherein the scheduling service identifies the GPU data and workload data by monitoring the workloads until a predetermined set of situations are identified in the monitored data.

* * * * *